Nov. 10, 1964     P. WARGO     3,156,839
ALTERNATOR
Filed April 2, 1962     2 Sheets-Sheet 1
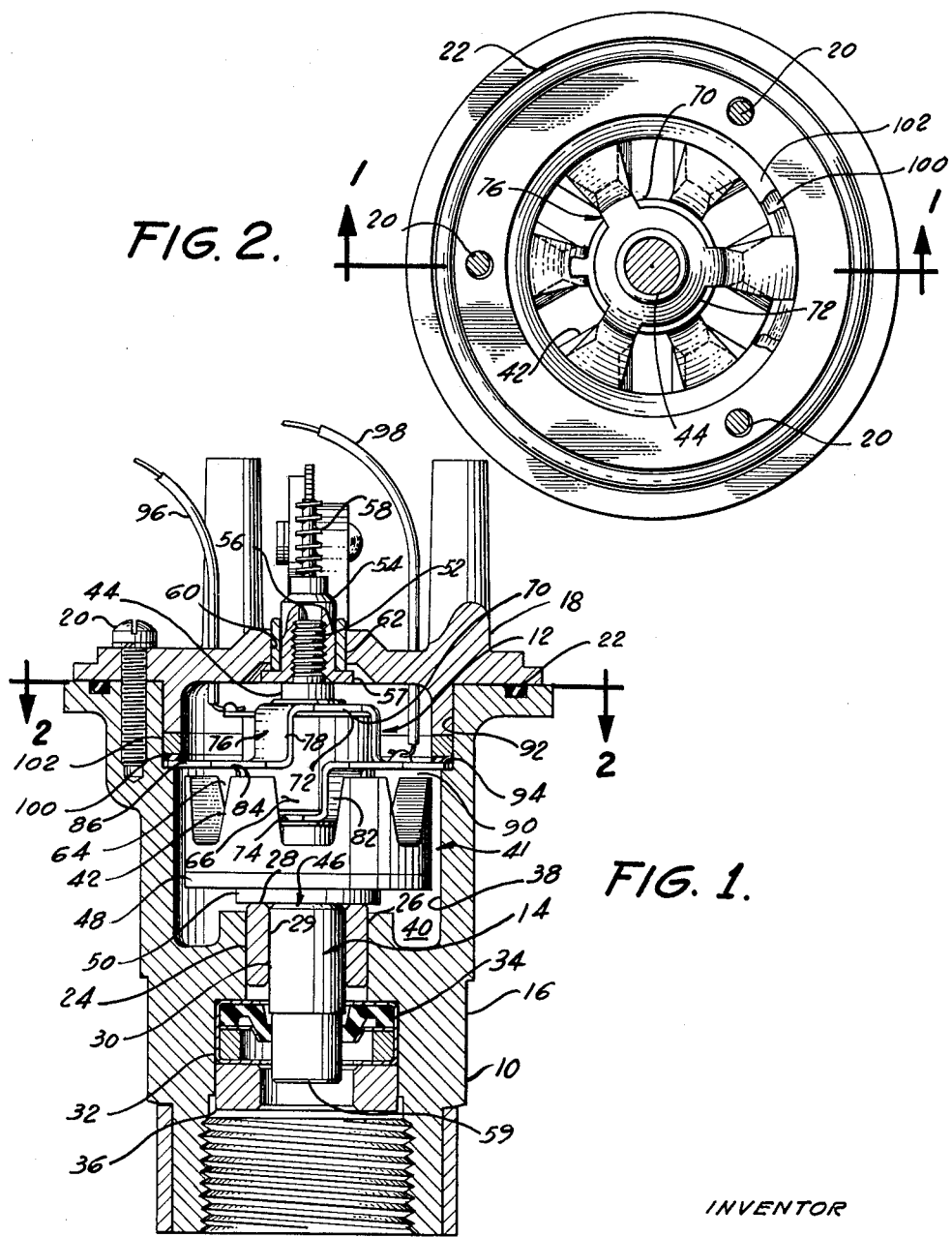
INVENTOR
Peter Wargo
By *William J. Newman*
Attorney

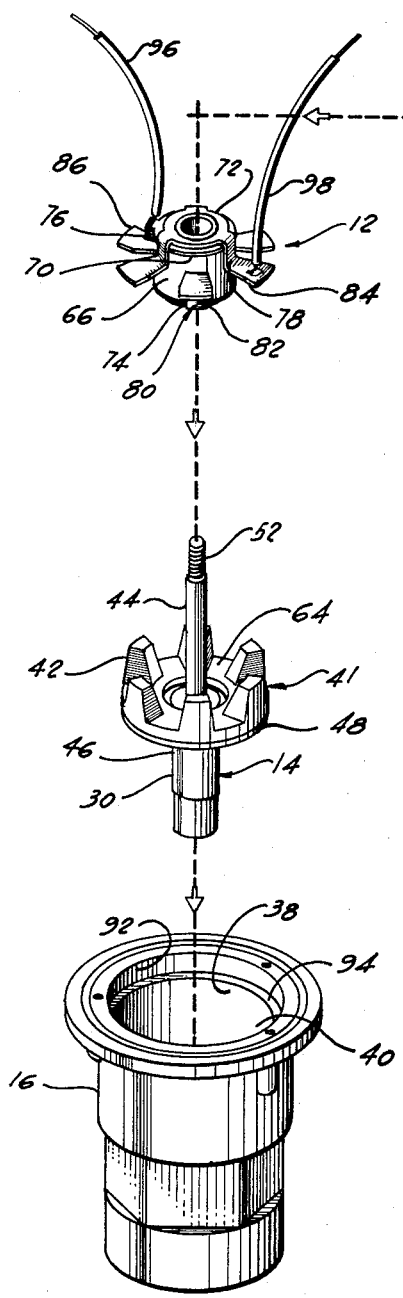
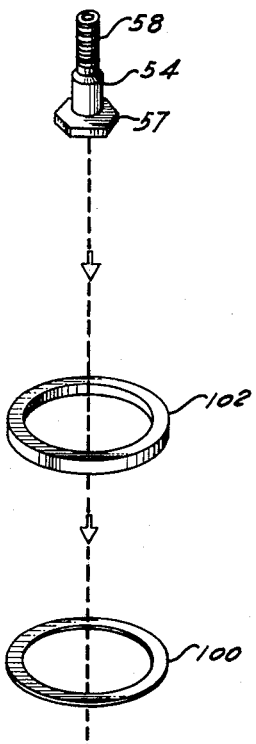
FIG. 3.
INVENTOR
Peter Wargo
By William J. Newman
Attorney

United States Patent Office 3,156,839
Patented Nov. 10, 1964

3,156,839
ALTERNATOR
Peter Wargo, Maywood, Ill., assignor to Stewart-Warner Corporation, Chicago, Ill., a corporation of Virginia
Filed Apr. 2, 1962, Ser. No. 184,334
14 Claims. (Cl. 310—156)

This invention relates generally to dynamo electric machines and more particularly to a relatively small, compact device of the permanent magnet type characterized by simplicity in manufacture and ease in assembly.

The present invention is particularly useful in the form of a permanent magnet alternator for generating electrical power for use in electric odometer or speedometer applications, but the invention has much wider application to all generators and electric motors of this type and it is not the intention to be limited specifically to a device useful in the above environment.

The use of electrical means for indicating both the speed of a moving vehicle and the amount of mileage traveled by the vehicle have created the need for a simplified electrical generator having great reliability and relatively high accuracy without undue maintenance problems. The universal acceptance of such devices has resulted in the need for small electric generators employing permanent magnets rather than battery power as the source of magnetic flux. A commonly accepted construction employs a permanent magnet coupled to the drive means to provide a rotating magnetic field and in most cases a number of circumferentially spaced stationary coils are alternately subjected to magnetic fields of dissimilar polarity for providing an alternating current output. The magnitude of the output current is proportional to the speed of the moving vehicle thereby providing a reliable and accurate electrical indication of vehicle speed. The permanent magnet type generators used in the past have been provided with a plurality of equally spaced stator coils in a salient arrangement, in most cases coplanar to the permanent magnet rotor.

It is a primary object of this invention to provide an improved permanent magnet dynamo machine in which the need for a plurality of salient type stator coils is completely eliminated.

It is a further object of this invention to provide an improved permanent magnet dynamo electric machine in which the number of elements required is reduced and which device may be simply manufactured and easily assembled.

In the field of electric speedometers where the improved dynamo electric machine provides an electrical current indicative of vehicle speed, it is necessary to insure that the electrical output remains correlated to vehicle speed over an extremely wide range. This requirement can be readily appreciated since safety precautions taken by the operator of the vehicle depends wholly upon an accurate knowledge of the vehicle speed. In this application as well as electrical apparatus in general, care must be taken that in spite of ambient or other thermal changes, the electrical output signal remains essentially constant. At the same time means must be provided for allowing adjustment of the elements making up the permanent magnet generator such that the speedometer can be readily calibrated by simple adjustment to provide variation in current output.

It is a further object of this invention to provide an improved permanent magnet generator particularly useful in vehicle speedometer applications in which the generator is self regulating for both ambient thermal changes and thermal changes due to current flow within the generator itself.

It is a further object of this invention to provide an improved dynamo electric machine in which the electrical output may be varied through a relatively wide range by a simple mechanical adjustment of the position between the rotating and stationary elements of the dynamo electric machine.

Other objects of this invention will be pointed out in the following detailed description and claims and illustrated in the accompanying drawings which disclose, by way of example, the principle of this invention and the best mode which has been contemplated of applying that principle.

In the drawings:
FIGURE 1 is a side elevational view in section of the device forming one embodiment of the present invention.
FIGURE 2 is a top plan view of a portion of the device shown in FIGURE 1 with the cover removed showing the method of locating the stator within the housing proper.
FIGURE 3 is a perspective, exploded view of the elements making up the apparatus shown in FIGURES 1 and 2.

In general, the apparatus of the present invention comprises a dynamo electric machine which may be used as a permanent magnet type generator in electric speedometer applications. The generator includes a central shaft mounted for rotation about its axis including a rotor construction having a number of sets of permanent magnet poles of dissimilar polarity spaced radially from the shaft on a common circular plate with the permanent magnet poles being equally spaced circumferentially about the axis to form a circular cavity therebetween. The generator further includes a single electrical coil surrounding the shaft, coaxial therewith and positioned within the circular cavity. A hollow core of magnetic material supports the coil with a pair of disc-like members forming field plates being fixed to the core at either end of the coil. Each of the discs include radial fingers which extend axially along the outer surface of the coil toward the center thereof and include terminal portions extending radially outward spaced from the ends of the pole pieces to form an air gap therewith. The terminal portions of the fingers are coplanar and are alternately coupled to a common disc member whereby rotation of the permanent magnet rotor causes an alternating current to be generated within the single stator coil. The magnet supporting plate for the permanent magnet pole is formed of soft iron having extremely low reluctance to provide a highly efficient flux path, reducing the over-all longitudinal dimensional requirements of the compact generator. To provide ambient thermal compensation as well as compensation for self heating of the stator coil, a thin ring of magnetic material whose permeability varies with temperature change is positioned on the side of the stator field plate fingers opposite that of the rotating permanent magnet. The air gap existing between the rotating permanent magnet and the spaced stator fingers is varied by axial displacement of the central shaft with respect to the stationary, single stator coil and its associated magnetic support structure.

Referring to the drawings, the improved dynamo electric machine in a preferred environment is utilized as a permanent magnet alternator in which the A.C. output is delivered to an electrical speedometer or odometer for indicating the relative speed and distance of a moving vehicle. The details of the mechanical connection between the drive mechanism and the rotor of the generator are not part of the present invention and will not be described in detail. Within cylindrical housing 10 there are two main portions of the generator, a stator construction indicated at 12 and a rotor construction 14. The cylindrical housing 10 is open at the top and includes a bottom section 16 and a cover 18 which is secured thereto by a plurality of screws 20 with conventional sealing means such as ring 22 acting to seal the cover and the main portion of the housing 16. The generator is shown in a position such that the axis of the rotor and stator lie in a vertical plane. This is for illustration purposes only and the generator may be positioned horizontally, vertically or inclined as desired.

Both the housing and cover may be appropriately cast or machined as desired with the main housing 16 including a central bore 24 in which is press-fitted bearing member 26. The bearing member 26 has an upper face 28 which may act as a thrust bearing and, an inner surface 29 receiving shaft 30 of the rotor assembly. Below central bore 24, there is provided counter bore 32 in which is positioned suitable sealing means 34 and retained therein by a conventional locking ring 36. A much larger bore 38 is formed within the upper portion of the main housing 16, forming a recess 40 which receives both the stator and rotor assemblies allowing free rotation of the permanent magnet assembly 41 which is rigidly coupled to the rotor shaft 30.

The rotor assembly includes a permanent magnet 41 having a plurality of circumferentially spaced, magnetic poles 42 forming a central cavity 64, the adjacent poles 42 being of unlike polarity. In order to mount the permanent magnet field assembly on shaft 30, the shaft includes a central portion 44 of reduced diameter forming an abutment surface 46. A relatively thin magnetic plate 48 is formed of soft iron of high permeability and is rigidly affixed to shaft 30 by appropriate means such as being press-fitted thereon. A spacer 50 is positioned between the magnetic plate 48 and the abutting surface 46 of the shaft 30. The integrally formed, multipole permanent magnet 41 is welded to the magnetic plate 48 by conventional welding techniques. It is important to note that the inclusion of the relatively thin magnetic plate 48 of disc form greatly reduces the over-all axial length of the magnetic field assembly of the rotor, therefore providing a resultant decrease in the over-all length of the device as a whole. This reduction in axial length is accomplished without compromising the flux carrying characteritsics of the permanent magnet assembly in that the relatively thin magnetic plate being formed of extremely high permeability material provides a path of relatively low reluctance for the permanent magnet flux. If the plate 48 were not used, the permanent magnet 41 must be thickened axially at its base because the axial dimension of the magnet 41 at the portion between adjacent poles 42 would have to approximate the thickness of each pole piece measured circumferentially. The permanent magnet 41 may be formed of conventional magnetic material such as Alnico #5.

The central portion of the shaft 30 terminates with a further reduced cross sectional portion 52 which may be threaded and acts to receive a separate thrust bearing 54. The trust bearing 54 includes a central bore 56 which is threaded to receive terminal portion 52 of the shaft and includes an outwardly directed flange 57 at the lower end thereof. The upper end of the thrust bearing 54 is provided with worm teeth 58 to effect the proper drive connection to auxiliary equipment such as an odometer (not shown). The cover 18 is rigidly coupled to the main portion 16 of the housing. Cover 18 is provided with a central aperture 60 within which is positioned a hollow sleeve member 62 having an internal diameter slightly in excess of the diameter of bearing member 54. In this manner, placement of the cover 18 on the main housing section 16 causes a thrust bearing 54 to protrude through sleeves 62. Since the shaft 30 threadedly engages thrust bearing 54, rotation of the thrust bearing with respect to the shaft 30 will result in axial shift of the magnet assembly 41 with respect to housing 16 within given limits. As will be appreciated more fully as the description proceeds, this will result in providing a convenient means for varying the air gap between the permanent magnet rotor assembly and the stator assembly.

At the bottom end of the shaft 30, there is provided a recess 59 which is adapted to receive the end of a rotatable stem of a flexible drive shaft or other drive means (not shown).

A unique and highly efficient stator construction forms an important aspect of the present invention. The stator construction can perhaps be best appreciated by reference to FIGURE 3 which shows the stator assembly at 12. Unlike conventional multicoil permanent magnet generators, the present invention incorporates a single, axially positioned coil which partially occupies cavity 64 formed by the radially spaced, permanent magnet poles 42. In order to axially position the single stator coil 66 there is provided a central hollow tube or core 68 upon which is wound the coil 66. In order to prevent the individual turns of the coil from shorting out on the metallic core, the coil 66 may be wound upon a suitable insulative support member 70. A pair of cooperating disc members 72 and 74 are rigidly coupled to the central core 68 by bending over the outer rim of the central core to povide magnetic field plates at the upper and lower end of the coil respectively. In the particular embodiment shown, each of the plates includes three circumferentially spaced, flux carrying fingers 76, the total number of fingers being equal to the number of permanent magnetic field poles 42 which in this case is six. The fingers 76, formed integrally with upper plate 72, are spaced one hundred and twenty mechanical degrees apart and are bent at right angles adjacent the outer periphery of the coil 66 to form portions 78 which are directed rearwardly toward the permanent magnet assembly 41. In like manner, the fingers 80, which are formed integrally with the lower plate 74, include axially directed portions 82 which lie against the outer peripheral surface of coil 66 and are directed toward the fingers 76 of plate 72. The fingers 76 include radially outward terminal portions 84 while fingers 80 include like terminal portions 86 which are coplanar and extend outwardly to overlie the upper surface of the individual permanent magnet poles 42. In this manner, a relatively closed magnetic circuit is formed between the permanent magnet rotor and the stator assembly 12 with the exception of the air gap 90 existing between the terminal portions 84 and 86 respectively of the stator assembly and the upper faces of the magnetic field poles 42.

In order to physically locate the stator assembly 12 within housing 10, the main cylindrical portion of the housing 16 is provided with an enlarged counter bore 92 adjacent its upper end acting to form a seat 94. It is upon this seat that the outer tips of the radial terminal portions 84 and 86 rests. The axial position of the stator assembly 12 is defined by seat 94. The operation of the permanent magnet generator is quite conventional in the sense that rotation of the permanent magnet rotor assembly 14 results in the alternate passage of unlike permanent magnet poles 42 across the terminal portions 84 and 86 of the stator assembly causing flux changes within these paths. The flux changes result in induced voltage changes across the coil with an alternating current output varying with the speed of rotation of rotor assembly 14 within the generator. Appropriate electrical connections such as leads 96 and 98 allow the A.C. current to be conducted to the electrically driven speedometer (not shown). These leads pass through suitable openings in the cover and may include sealing means to prevent contaminating of chamber 40.

It is highly important that the speedometer be calibrated to give accurate speedometer readings over a wide range while at the same time be relatively uninfluenced by change in ambient temperature conditions such as those created by climatic changes from the summer to winter months. It is therefore necessary to provide automatic thermal compensation means. Since the voltage generator is dependent upon the amount of flux in the magnetic circuit, especially that portion of the magnetic circuit reaching the stator coil. It is highly advantageous to provide means for varying the reluctance of the magnetic circuit automatically as a result of temperature change. The present invention advantageously makes use of a magnetic shorting means for shorting a portion of the magnetic flux reaching the stator field plates. This means comprises a ring formed of a magnetic material such as nickel alloy having variable permeabiilty with temperature change. The ring 100 has an outer diameter slightly less than the diameter of bore 92 with the thickness and width of the ring being relatively small. The ring acts to short the portion of the magnetic flux passing from one of the permanent field poles 42 to one radial field plate portion 84 through the central hollow bushing core 68, back to the adjacent radial field plate portion 86 and to the adjacent permanent magnet field pole 42 of unlike polarity. While most of the useful flux takes this desired path to induce a voltage acros scoil 66, a portion is diverted through the ring. The amount of flux diverted varies with temperature due to the variable permeability of the material making up the ring 100. Since reluctance usually increases with temperature increase, it is necessary to decrease the flux carried by the shunt with increase in temperature, either due to ambient or internal conditions.

In order to securely position the stator assembly 12 as well as to position the shorting ring 100 upon the field plates, a plastic spacer 102 in ring form is positioned immediately above the shorting ring 100. Flange 104 formed on cover 18 contacts the spacer 102 forcing it against the shorting ring 100 while holding the radial flanges 84 and 86 on the seat or rim 94.

It is important to note that there is a tendency for the permanent magnet assembly 41 to attach itself to the field plates 84 and 86 due to the normal attraction of a permanent magnet for an element formed of magnetic material. Since the permanent magnet assembly 41 is rigidly coupled to shaft 30, there is a tendency for shaft 30 to move out of its bearing 26. This upward axial movement is resisted by thrust bearing 54 which rides on journal insert 60. As mentioned previously, the air gap 90 may be adjusted by rotating the threaded thrust bearing 54 on the upper terminal portions 52 of shaft 30, the limits of the air gap being defined by the point where ring 50 will ride upon bearing 26 at the contact surface point 28.

It is apparent from the foregoing description that the apparatus of the present invention provides a number of advantageous features. The use of a plurality of radially directed field plates or fingers allows the use of but a single coil which may be centrally located within the rotating permanent magnet eliminating the need for an individual stator coil for each rotor field pole. The thermal compensation ring with variable permeability provides extremely efficient ambient thermal compensation since the compensation is performed adjacent the stator field plate. This is because the compensation is provided only for the flux reaching the stator and not for flux lost to the stator coil. In addition, placement of the thermal compensation ring in the vicinity of the stator coil results in compensation for self heating of the coil due to changes in coil current due to its proximity thereto. If the compensation means were applied directly to the magnet, compensation will be too far removed to sense the heat changes in the coil. Due to the inherent desire for the permanent magnet assembly to attract itself to the stator field plates, gap adjustment is enhanced and the use of a threaded thrust bearing advantageously allows a single adjustment to achieve the desired gap change.

It is apparent also that while the features of the invention are applied to a dynamo electric machine used as an alternator, the present invention is equally applicable to a machine of this type used as a motor of both the direct current and alternating current type.

While there have been shown, described and pointed out the fundamental novel features of the invention as applied to a preferred embodiment, it will be understood that various omissions and substitutions and changes in the form and details of the device illustrated and its operation may be made by those skilled in the art without departing from the spirit of the invention. It is the intention, therefore, to be limited only as indicated by the scope of the following claims.

What is claimed is:

1. An improved dynamo electric machine having a rotor and stator spaced apart along the axis of rotor rotation to provide an axial air gap therebetween, comprising a rotor assembly including a central shaft mounted for rotation about its axis, at least two permanent magnet poles of unlike polarity spaced radially from said central shaft and equally spaced circumferentially about the shaft axis to form a circular cavity therebetween, a stator assembly including a hollow core of magnetic material surrounding said shaft and positioned within said circular cavity, a coil positioned coaxially upon said hollow core within said circular cavity and spaced from said magnetic poles, a pair of field plates of magnetic material coupled to said core at either end thereof, each of said field plates including fingers extending axially along the outer surface of said coil toward the center thereof and terminating in portions extending radially away from said coil, said terminal portions of said fingers being coplanar and alternately coupled to a common field plate whereby rotation of said permanent magnet rotor will cause an alternating current to be generated within said single stator coil.

2. Apparatus as claimed in claim 1 wherein said stator assembly includes a thin ring of magnetic material whose permeability varies with temperature change, said ring being positioned adjacent said terminal portions of said fingers to provide automatic thermal compensation.

3. In a dynamo electric machine having a rotor and stator spaced apart along the axis of rotor rotation to provide an axial air gap therebetween and including a rotor assembly having a central shaft mounted for rotation about its axis, at least two permanent magnet poles of unlike polarity spaced radially from the central shaft equally spaced circumferentially about the shaft axis to form a circular cavity therebetween, the improvement comprising a stator construction including a hollow core of magnetic material, a stator coil positioned on said core, said core being positioned partially within said circular cavity, a pair of field plates of identical configuration being rigidly coupled to said core at either end thereof, each of said field plates including equally spaced radial fingers, with the total number of fingers equalling the number of permanent magnet poles of said rotor assembly, said fingers extending axially from the end of said core along the outer surface of said coil toward the center thereof and terminating in portions extending radially outward from the center of said coil with the terminal portions of one of said plates being circumferentially offset from the terminal portions of said other plate so as to lie centrally therebetween and coplanar therewith to form an air gap between said fingers and the ends of said permanent magnet poles of said rotor assembly.

4. Apparatus as claimed in claim 3 wherein said stator assembly further includes a thin ring of magnetic material whose permeability varies with temperature change, said ring being positioned adjacent the terminal portions of said fingers to vary the flux shunted by said ring and to effect automatic thermal compensation thereby.

5. A permanent magnet field pole assembly for use in a dynamo electric machine having a rotor and stator spaced apart along the axis of rotor rotation to provide an axial air gap therebetween including, a rotor assembly having a central shaft mounted for rotation about its axis, a stator assembly including a hollow core of magnetic material positioned coaxially of said central shaft, a stator core positioned thereon, a magnetic field plate coupled to said hollow core including equally spaced radial fingers, said permanent magnet assembly comprising; at least two permanent magnet field poles of unlike polarity, equally spaced circumferentially from each other and oriented axially toward one end of said dynamo electric machine, said field poles spaced radially from said central shaft to form a central cavity therewith for partially receiving said stator assembly with the ends of said permanent magnet field poles being spaced slightly from said radially extending fingers of said field plates to form an air gap therewith, said axially directed field poles being joined at least by a relatively thin disc of high permeability material whereby the over-all longitudinal dimension of said permanent magnet field pole assembly is greatly reduced without compromising the magnetic flux carrying ability of the machine components.

6. In a dynamo electric machine having a rotor and stator spaced apart along the axis of rotor rotation to provide an axial air gap therebetween including a rotor assembly having a central shaft mounted for rotation about its axis and a stator assembly including a hollow core of magnetic material positioned coaxially of said central shaft and having a stator core positioned thereon, a pair of field plates rigidly coupled to respective ends of said hollow core, said field plates including equally spaced radial fingers, said fingers extending along the outer peripheral surface of said coil toward the center thereof and terminating in portions extending radially outward, said portions of both plates being coplanar and alternately coupled to a common field plate, the improvement comprising a permanent magnet assembly carried by said central shaft including at least two permanent magnet field poles of unlike polarity, equally spaced circumferentially from each other, oriented axially toward one end of said dynamo electric machine and spaced radially from said central shaft to form a central cavity therewith, said central cavity acting to partially receive said stator assembly, whereby the ends of said permanent magnet field poles are spaced slightly from said radially extending, terminal portions of said fingers to form an air gap therewith, said axially directed field poles being joined by a relatively thin, disc shaped, integral base portion and a second relatively thin disc of high permeability material coupled thereto whereby the over-all longitudinal dimension of said permanent magnet pole assembly is greatly reduced without compromising the magnetic flux carrying ability of the machine components.

7. An apparatus as claimed in claim 6 wherein said stator assembly includes a thin ring of magnetic material whose permeability varies with temperature change, said ring being positioned adjacent the terminal portions of said fingers to shunt a portion of said field flux to effect automatic thermal compensation thereby.

8. In a dynamo electric machine having a rotor and a stator spaced apart along the axis of rotor rotation to provide an axial air gap therebetween including a rotor assembly having a central shaft mounted for rotation about its axis and a stator assembly including a hollow core of magnetic material coaxial of said shaft, a coil positioned upon said hollow core, a pair of field plates of magnetic material coupled to said core at either end thereof and including fingers extending axially along the outer surface of said coil toward the center thereof and terminating in portions extending radially away from said coil, said terminal portions of said fingers being coplanar and alternately coupled to a common field plate, the improvement comprising a permanent magnet assembly including at least two permanent magnet field poles of unlike polarity, equally spaced circumferentially from each, oriented axially toward one end of said dynamo electric machine and spaced from said central shaft to form a cavity therebetween, said permanent magnet field poles being spaced slightly from the terminal portions of said fingers, whereby said cavity receives a portion of said stator coil, said axially directed field poles being integrally joined by a relatively thin disc shaped base portion, and a second relatively thin disc of high permeability magnetic material coupled to said base portion whereby the over-all longitudinal dimension of said permanent magnet assembly and said dynamo electric machine is greatly reduced without compromising the magnetic flux carrying ability of the machine components.

9. Apparatus as claimed in claim 8 wherein said stator assembly includes a thin ring of magnetic material whose permeability varies with temperature change, said ring being positioned adjacent said terminal portions of said fingers and acting as a variable magnetic shunt to effect automatic thermal compensation thereby.

10. An improved dynamo electric machine having a housing, a rotor and a stator positioned within said housing and spaced apart along the axis of rotor rotation to provide an axial air gap therebetween including a stator assembly having field coil means and an axially fixed field plate of magnetic material, a rotor assembly positioned coaxially of said stator assembly including a central shaft mounted for rotation about its axis, means limiting movement of said rotor in an axial direction, at least two permanent magnet field poles of unlike polarity being rigidly coupled to said shaft and being axially oriented toward one end of said dynamo electric machine and coaxial to said field plate whereby said permanent magnet field poles are magnetically attracted to said fixed field plate, and adjustable means for limiting the axial movement of said rotor assembly toward said stator assembly to define the variable air gap between said field poles and the field plates.

11. Apparatus as claimed in claim 10 wherein said means for limiting the axial movement of said rotor assembly toward said stator field plate comprises a thrust bearing on the stator end of said shaft with said thrust end received within journal means carried by said dynamo electric machine housing, said dynamo electric machine further including means for varying the axial distance between said thrust bearing and said field poles, whereby the width of said air gap is varied thereby.

12. Apparatus as claimed in claim 11 wherein said shaft is formed of two parts, said parts being threadedly coupled, one of said parts carrying said permanent magnet assembly and said other part carrying said thrust bearing, whereby relative rotation of said threaded parts acts to vary the axial distance between the elements carried thereby.

13. An improved dynamo electric machine having a rotor and stator spaced apart along the axis of rotor rotation to provide an axial air gap therebetween, comprising; a cylindrical housing member including a relatively large central bore for receiving axially spaced rotor and stator assemblies, said rotor assembly including a central shaft mounted for rotation about its axis and having limited freedom of movement in an axial direction within said bore, said rotor assembly further including at least two permanent magnet poles of unlike polarity, spaced radially from said central shaft and equally spaced circumferentially about the shaft axis to form a circular cavity therebetween, a stator assembly including a hollow core of magnetic material surrounding said shaft and positioned within said circular cavity, a coil positioned coaxially upon said hollow core within said circular cavity and spaced from said magnetic poles, a pair of field plates of magnetic material coupled to said core at either end thereof, each of said field plates including fingers extending axially along the outer surface of said coil towards the center thereof and terminating in portions extending radially away from said coil, said terminal portions of said fingers being coplanar and alternately coupled to a common field plate, said housing including a counter bore at one end thereof to define a seating area at the junction between said first bore and said counter bore, the terminal portions of said fingers having radial dimensions slightly less than said counter bore, whereby said seating area defines the axial position of said relatively fixed stator assembly with said rotor assembly being magnetically attracted to said fixed field plate, and adjusting means for limiting the axial movement of said rotor assembly toward said stator field plate to define a variable air gap between said spaced magnetic field poles and the terminal portions of said fingers.

14. Apparatus as claimed in claim 13 wherein said stator assembly includes a thin ring of magnetic material whose permeability varies with temperature change, said ring having a configuration such that insertion within said counter bore and placement adjacent the terminal portion of said fingers provides a variable magnetic shunt to effect automatic thermal compensation thereby.

References Cited in the file of this patent

UNITED STATES PATENTS

| 1,971,463 | Rothe | Aug. 28, 1934 |
| 2,070,447 | Morrill | Feb. 9, 1937 |

FOREIGN PATENTS

| 735,117 | France | Aug. 13, 1932 |